(12) United States Patent
Winterton

(10) Patent No.: US 8,030,369 B2
(45) Date of Patent: Oct. 4, 2011

(54) CONTACT LENSES WITH IMPROVED WEARING COMFORT

(75) Inventor: Lynn Cook Winterton, Alpharetta, GA (US)

(73) Assignee: Novartis AG, Basel (CH)

( * ) Notice: Subject to any disclaimer, the term of this patent is extended or adjusted under 35 U.S.C. 154(b) by 1050 days.

(21) Appl. No.: 11/243,930

(22) Filed: Oct. 5, 2005

(65) Prior Publication Data

US 2006/0079598 A1    Apr. 13, 2006

Related U.S. Application Data

(60) Provisional application No. 60/618,157, filed on Oct. 13, 2004.

(51) Int. Cl.
*G02B 1/04* (2006.01)

(52) U.S. Cl. ............. 523/106; 522/84; 522/85; 522/86; 522/152; 522/154; 525/56; 525/57; 525/58; 525/59; 525/61

(58) Field of Classification Search ............ 522/84, 522/85, 86, 152, 154; 523/106, 108; 525/56, 525/57, 58, 59, 61
See application file for complete search history.

(56) References Cited

U.S. PATENT DOCUMENTS

| | | | | |
|---|---|---|---|---|
| 3,220,960 A * | 11/1965 | Drahoslav et al. | ............ | 521/149 |
| 5,508,317 A * | 4/1996 | Muller | ............ | 522/85 |
| 5,583,163 A | 12/1996 | Muller | ............ | 522/152 |
| 5,782,460 A * | 7/1998 | Kretzschmar et al. | ........ | 264/1.36 |
| 5,789,464 A * | 8/1998 | Muller | ............ | 523/108 |
| 5,849,810 A * | 12/1998 | Muller | ............ | 522/85 |
| 5,849,841 A * | 12/1998 | Muhlebach et al. | ............ | 525/59 |
| 6,042,756 A * | 3/2000 | Muller et al. | ............ | 264/1.36 |
| 6,149,692 A * | 11/2000 | Lally et al. | ............ | 8/444 |
| 6,149,842 A | 11/2000 | Lally et al. | ............ | 264/1.36 |
| 6,162,844 A * | 12/2000 | Lally et al. | ............ | 523/106 |
| 6,407,145 B1 * | 6/2002 | Muller | ............ | 522/84 |
| 6,849,210 B2 * | 2/2005 | Bothe et al. | ............ | 264/1.36 |
| 7,049,351 B2 * | 5/2006 | Phelan et al. | ............ | 523/108 |

FOREIGN PATENT DOCUMENTS

| | | |
|---|---|---|
| DE | 3738215 | 5/1990 |
| EP | 0 602 810 | 6/1994 |
| WO | WO 99/26087 | 5/1999 |

OTHER PUBLICATIONS

European Standard Search Report.

* cited by examiner

*Primary Examiner* — David W Wu
*Assistant Examiner* — Marie Reddick
(74) *Attorney, Agent, or Firm* — Jian Zhou

(57) ABSTRACT

The invention relates to a biomedical molding, in particular a contact lens, which is obtainable by crosslinking, in a mold, an aqueous solution of a crosslinkable polyvinyl alcohol (PVA) prepolymer comprising at least 0.5 weight-%, based on the entire formulation, of a non-reactive PVA, wherein the number-average molecular weight of the non-reactive PVA is higher than that of the crosslinkable PVA. A contact lens of the invention has an improved wearing comfort.

17 Claims, No Drawings

CONTACT LENSES WITH IMPROVED WEARING COMFORT

This application claims the benefit under 35 USC §119 (e) of U.S. provisional application No. 60/618,157, filed Oct. 13, 2004, incorporated by reference in its entirety.

The present invention relates to biomedical moldings, in particular ophthalmic moldings such as contact lenses, providing an improved wearer comfort, and a process for the manufacture of said moldings.

BACKGROUND OF THE INVENTION

The manufacture of biomedical moldings such as in particular contact lenses by crosslinking an aqueous solution of a water-soluble polyvinyl alcohol (PVA) prepolymer in a mold is known, for example, from U.S. Pat. No. 5,583,163. Contact lenses manufactured by the process of the prior art reference have advantageous properties such as a good compatibility with the human cornea resulting in a high wearing comfort and the absence of irritation and allergenic effects. However, while the initial wearing comfort—as with most contact lenses—is good, said comfort decreases over time and particularly may cause sensitive eye problems at the end of the day. It is therefore an object of the invention to increase the prolonged wearer comfort and in particular the end-of-day comfort of current PVA contact lenses.

SUMMARY OF THE INVENTION

Surprisingly, it now has been found that the wearer comfort of contact lenses obtainable according to U.S. Pat. No. 5,583,163 may be improved considerably, if during manufacture one or more high molecular weight non-reactive PVAs are added to the aqueous PVA prepolymer solution.

The present invention therefore in one aspect relates to a biomedical molding which is obtainable by crosslinking in a mold an aqueous solution of a crosslinkable polyvinyl alcohol (PVA) prepolymer comprising at least 0.1 weight-%, based on the entire formulation, of a non-reactive PVA, wherein the number-average molecular weight of the non-reactive PVA is higher than that of the crosslinkable PVA.

The process for the manufacture of the moldings of the invention, especially contact lenses, comprises the following steps:
a) preparing an aqueous solution comprising a water-soluble polyvinyl alcohol (PVA) prepolymer having crosslinkable groups and at least 0.1 weight-%, based on the entire formulation, of a non-reactive PVA having a number-average molecular weight which is higher than that of the PVA prepolymer,
b) introducing the solution obtained into a mold,
c) triggering the crosslinking, and
d) opening the mold such that the molding can be removed from the mold.

DETAILED DESCRIPTION OF THE INVENTION

The decisive criteria determining the suitability of a PVA prepolymer for use in the process according to the invention are that the prepolymer is soluble in water and that it comprises crosslinkable groups.

In accordance with the invention, the criterion that the prepolymer is soluble in water denotes in particular that the prepolymer is soluble in a concentration of approximately from 3 to 90% by weight, preferably approximately from 5 to 60% by weight, especially approximately from 10 to 60% by weight, in a substantially aqueous solution. Insofar as it is possible in an individual case, prepolymer concentrations of more than 90% are also included in accordance with the invention. Especially preferred concentrations of the prepolymer in solution are from approximately 15 to approximately 50% by weight, especially from approximately 15 to approximately 40% by weight, for example from approximately 25% to approximately 40% by weight.

The number average molecular weight $M_n$ of the prepolymer is, within wide limits, not critical, but is in general $\geq 2000$. A preferred molecular weight range is from about 10000 to about 1000000, even more preferred from 10000 to 50000 and in particular from 12000 to 25000.

A water-soluble PVA prepolymer according to the invention preferably comprises a suitable polyvinylacetate (PVAc) backbone and crosslinkable groups.

"Crosslinkable groups" denotes customary crosslinkable groups well-known to the person skilled in the art, such as, for example, photocrosslinkable or thermally crosslinkable groups. Crosslinkable groups such as those already proposed for the preparation of contact lens materials are especially suitable. Those include especially, but not exclusively, groups comprising carbon-carbon double bonds, such as an acrylate, methacrylate, acrylamide, methacrylamide, vinyl or styryl group. To demonstrate the large variety of suitable crosslinkable groups, there are mentioned here, merely by way of example, the following crosslinking mechanisms: radical polymerization, [2+2] cycloaddition, Diels-Alder reaction, ROMP (Ring Opening Metathesis Polymerization), vulcanization, cationic crosslinking and epoxy hardening. A preferred crosslinkable group is a group comprising a carbon-carbon double bond, in particular an acrylate, methacrylate, acrylamide or methacrylamide group.

The PVA prepolymer used in accordance with the invention preferably comprises crosslinkable groups in an amount of from approximately 0.5 to approximately 80% equivalents, based on the equivalents of monomers that form the polymeric backbone, especially approximately from 1 to 50%, preferably approximately from 1 to 25%, preferably approximately from 2 to 15% and especially preferably approximately from 3 to 10%. Also especially preferred are amounts of crosslinkable groups of from approximately 0.5 to approximately 25% equivalents, especially approximately from 1 to 15% and especially preferably approximately from 2 to 12%, based on the equivalents of monomers that form the polymeric backbone.

Preferably, the prepolymers used in the process according to the invention are previously purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents.

The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner.

The prepolymer according to the invention is preferably a polyvinyl alcohol that, based on the number of hydroxy groups of the polyvinyl alcohol, comprises from approximately 0.5 to approximately 80% of units of formula

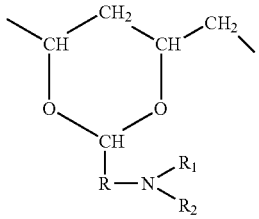

(1)

wherein R is $C_1$-$C_8$-alkylene, $R_1$ is hydrogen or $C_1$-$C_7$-alkyl and $R_2$ is an olefinically unsaturated, electron-attracting, copolymerizable radical preferably having up to 25 carbon atoms.

$R_2$ is, for example, an olefinically unsaturated acyl radical of formula $R_3$—CO—, in which $R_3$ is an olefinically unsaturated copolymerizable radical having from 2 to 24 carbon atoms, preferably from 2 to 8 carbon atoms, especially preferably from 2 to 4 carbon atoms. In another embodiment, the radical $R_2$ is a radical of formula

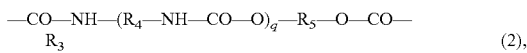

(2), wherein q is zero or one and $R_4$ and $R_5$ are each independently $C_2$-$C_8$-alkylene, $C_6$-$C_{12}$-arylene, a saturated divalent $C_6$-$C_{10}$-cycloaliphatic group, $C_7$-$C_{14}$-arylenealkylene or $C_7$-$C_{14}$-alkylenearylene or $C_{13}$-$C_{16}$-arylenealkylenearylene, and $R_3$ is as defined above.

The prepolymer used according to the invention is therefore especially a polyvinyl alcohol that, based on the number of hydroxy groups of the polyvinyl alcohol, comprises from approximately 0.5 to approximately 80% of units of formula

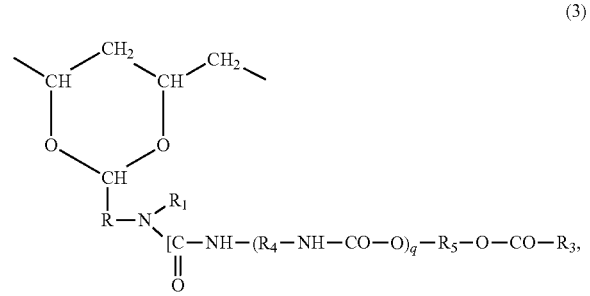

(3)

wherein R is $C_1$-$C_8$-alkylene, $R_1$ is hydrogen or $C_1$-$C_7$-alkyl, p is zero or one, q is zero or one, $R_3$ is an olefinically unsaturated copolymerizable radical having from 2 to 8 carbon atoms and $R_4$ and $R_5$ are each independently $C_2$-$C_8$-alkylene, $C_6$-$C_{12}$-arylene, a saturated divalent $C_6$-$C_{10}$-cycloaliphatic group, $C_7$-$C_{14}$-arylenealkylene or $C_7$-$C_{14}$-alkylenearylene or $C_{13}$-$C_{16}$-arylenealkylenearylene.

An alkylene radical R may be straight-chained or branched. Suitable examples include octylene, hexylene, pentylene, butylene, propylene, ethylene, methylene, 2-propylene, 2-butylene and 3-pentylene. Alkylene R has preferably 1 to 6 and especially preferably 1 to 4 carbon atoms. The meanings methylene and butylene are especially preferred.

$R_1$ is preferably hydrogen or $C_1$-$C_4$-alkyl, especially hydrogen.

Alkylene $R_4$ or $R_5$ preferably has from 2 to 6 carbon atoms and is especially straight-chained. Suitable examples include propylene, butylene, hexylene, dimethylethylene and, especially preferably, ethylene.

Arylene $R_4$ or $R_5$ is preferably phenylene that is unsubstituted or is substituted by $C_1$-$C_4$-alkyl or $C_1$-$C_4$-alkoxy, especially 1,3-phenylene or 1,4-phenylene or methyl-1,4-phenylene.

A saturated divalent cycloaliphatic group $R_4$ or $R_5$ is preferably cyclohexylene or cyclohexylene-$C_1$-$C_4$-alkylene, for example cyclohexylenemethylene, that is unsubstituted or is substituted by one or more methyl groups, such as, for example, trimethylcyclohexylenemethylene, for example the divalent isophorone radical.

The arylene unit of alkylenearylene or arylenealkylene $R_4$ or $R_5$ is preferably phenylene, unsubstituted or substituted by $C_1$-$C_4$-alkyl or I$C_1$-$C_4$-alkoxy, and the alkylene unit thereof is preferably $C_1$-$C_8$-alkylene, such as methylene or ethylene, especially methylene. Such radicals $R_4$ or $R_5$ are therefore preferably phenylenemethylene or methylenephenylene.

Arylenealkylenearylene $R_4$ or $R_5$ is preferably phenylene-$C_1$-$C_4$-alkylene-phenylene, for example phenyleneethylenephenylene.

The radicals $R_4$ and $R_5$ are each independently preferably $C_2$-$C_6$-alkylene; phenylene, unsubstituted or substituted by $C_1$-$C_4$-alkyl; cyclohexylene; cyclohexylene-$C_1$-$C_4$-alkylene, unsubstituted or substituted by $C_1$-$C_4$-alkyl; phenylene-$C_1$-$C_4$-alkylene; $C_1$-$C_4$-alkylenephenylene; or phenylene-$C_1$-$C_4$-alkylene-phenylene.

The olefinically unsaturated copolymerizable radical $R_3$ having from 2 to 24 carbon atoms is preferably $C_2$-$C_{24}$-alkenyl, especially $C_2$-$C_8$-alkenyl and especially preferably $C_2$-$C_4$-alkenyl, for example ethenyl, 2-propenyl, 3-propenyl, 2-butenyl, hexenyl, octenyl or dodecenyl. The meanings ethenyl and 2-propenyl are preferred, so that the group —CO—$R_3$ is preferably the acyl radical of acrylic or methacrylic acid.

The divalent group —$R_4$—NH—CO—O— is present when q is one and absent when q is zero. Prepolymers in which q is zero are preferred.

The divalent group —CO—NH—($R_4$—NH—CO—O)$_q$—$R_5$—O— is present when p is one and absent when p is zero. Prepolymers in which p is zero are preferred.

In prepolymers in which p is one the index q is preferably zero. Prepolymers in which p is one, the index q is zero and $R_5$ is $C_2$-$C_8$-alkylene are especially preferred.

A preferred prepolymer used according to the invention is therefore especially a polyvinyl alcohol that, based on the number of hydroxy groups of the polyvinyl alcohol, comprises from approximately 0.5 to approximately 80% of units of formula (3) in which R is $C_1$-$C_6$-alkylene, p is zero and $R_3$ is $C_2$-$C_8$-alkenyl.

A further preferred prepolymer used according to the invention is therefore especially a polyvinyl alcohol that, based on the number of hydroxy groups of the polyvinyl alcohol, comprises from approximately 0.5 to approximately 80% of units of formula (3), in which R is $C_1$-$C_6$-alkylene, p is one, q is zero, $R_5$ is $C_2$-$C_6$-alkylene and $R_3$ is $C_2$-$C_8$-alkenyl.

A further preferred prepolymer used according to the invention is therefore especially a polyvinyl alcohol that, based on the number of hydroxy groups of the polyvinyl alcohol, comprises from approximately 0.5 to approximately 80% of units of formula (3) in which R is $C_1$-$C_6$-alkylene, p is one, q is one, $R_4$ is $C_2$-$C_6$-alkylene, phenylene, unsubstituted or substituted by $C_1$-$C_4$-alkyl, cyclohexylene or cyclohexylene-$C_1$-$C_4$-alkylene, unsubstituted or substituted by $C_1$-$C_4$-alkyl, phenylene-$C_1$-$C_4$-alkylene, $C_1$-$C_4$-alkylene-phenylene or phenylene-$C_1$-$C_4$-alkylene-phenylene, $R_5$ is $C_2$-$C_6$-alkylene and $R_3$ is $C_2$-$C_8$-alkenyl.

The prepolymers used according to the invention are preferably a polyvinyl alcohols that, based on the number of hydroxy groups of the polyvinyl alcohol, comprise from approximately 0.5 to approximately 80%, especially approximately from 1 to 50%, preferably approximately from 1 to 25%, preferably approximately from 2 to 15% and especially preferably approximately from 3 to 10%, of units of formula (3). Prepolymers according to the invention which are provided for the manufacture of contact lenses comprise, based on the number of hydroxy groups of the polyvinyl alcohol, especially from approximately 0.5 to approximately 25%, especially approximately from 1 to 15% and especially preferably approximately from 2 to 12%, of units of formula (3).

Derivatized polyvinyl alcohols according to the invention preferably have a number average molecular weight $M_n$ of at least 10 000. As an upper limit the polyvinyl alcohols may have an average molecular weight $M_n$ of up to 500 000. Preferably, the polyvinyl alcohols have a number average molecular weight of up to 100 000, especially up to approximately 50 000 and especially preferably approximately from 12000 to 25000.

In addition, the polyvinyl alcohols used may also comprise small proportions, for example up to 20%, preferably up to 5%, of copolymer units of ethylene, propylene, acrylamide, methacrylamide, dimethacrylamide, hydroxyethyl methacrylate, methyl methacrylate, methyl acrylate, ethyl acrylate, vinylpyrrolidone, hydroxyethyl acrylate, allyl alcohol, styrene or similar customarily used comonomers.

Polyvinyl alcohol is usually prepared by hydrolysis of the corresponding homopolymeric polyvinyl acetate. In a preferred embodiment, the polyvinyl alcohol derivatized in accordance with the invention comprises less than 50% of polyvinyl acetate units, especially less than 20% of polyvinyl acetate units. Preferred amounts of residual acetate units in the polyvinyl alcohol derivatized in accordance with the invention, based on the sum of vinyl alcohol units and acetate units, are approximately from 3 to 20%, preferably approximately from 5 to 16% and especially approximately from 10 to 14%.

The prepolymers comprising units of formula (1) or (3) are known, for example, from U.S. Pat. No. 5,508,317 and may be prepared according to the processes described therein.

The further non-reactive PVA being added to the solution of the crosslinkable PVA is a PVA which is devoid of polymerizable groups, and which has an average molecular weight $M_n$ being higher than that of the PVA prepolymer.

Non-reactive PVAs of all kinds, for example those with low, medium or high polyvinyl acetate contents may be employed. In addition, the PVAs used may also comprise small proportions, for example up to 20%, preferably up to 5%, of copolymer units as mentioned before. The use of non-reactive PVAs with a contents of polyvinyl acetate units of less than 20%, preferably lower than 2%, is preferred.

The number-average molecular weight $M_n$ of the non-reactive PVA is, for example, higher by at least 10000, preferably by at least 20000, than that of the crosslinkable PVA. For example, in the preferred case of a PVA prepolymer having an average molecular weight $M_n$ of from 12000 to 25000, the average molecular weight $M_n$ of the non-reactive PVA is, for example, from 25000 to 100000, preferably from 30000 to 75000 and in particular from 35000 to 70000.

The non-reactive PVA group is present in the aqueous solution of the crosslinkable PVA in an amount of, for example, from 0.05 to 10% by weight, preferably from 0.1 to 5.0% by weight, more preferably from 0.25 to 3% by weight, and in particular from 0.4 to 1.0% by weight, each based on the entire weight of the aqueous solution.

In a preferred embodiment of the invention, a mixture of two or more different non-reactive PVAs is added to the solution of the crosslinkable PVA. The difference in average molecular weight $M_n$ between each of the non-reactive PVAs is, for example, at least 10000. For example, in a preferred embodiment of the invention, the PVA prepolymer has an average molecular weight $M_n$ of from 12000 to 25000, and two non-reactive PVAs, one having a lower average molecular weight $M_n$ of, for example, from 25000 to 50000, preferably from 30000 to 50000, and the other one having a higher average molecular weight $M_n$ of, for example, from above 50000 to 100000, preferably from above 50000 to 75000, are added.

In case of two or more different non-reactive PVAs, the total amount thereof in the aqueous solution of the prepolymer is as described before including the preferences given. The weight proportion of the lower molecular weight and higher molecular weight non-reactive PVA may vary within broad ranges, but is, for example, from 1:1 to 5:1, preferably from 1:1 to 4:1, and in particular from 1:1 to 3:1.

The non-reactive polyvinyl alcohols employed in the present invention are known and are commercially available, for example under the brand name MOWIOL® (polyvinyl alcohol) from KSE (Kuraray Specialities Europe).

Within the scope of this invention, aqueous solutions of the prepolymer and the non-reactive PVA(s) comprise especially solutions of the components in water, in aqueous salt solutions, especially in aqueous salt solutions that have an osmolarity of approximately from 200 to 450 milliosmol per 1000 ml (unit: mOsm/l), preferably an osmolarity of approximately from 250 to 350 mOsm/l, especially approximately 300 mOsm/l, or in mixtures of water or aqueous salt solutions with physiologically tolerable polar organic solvents, such as, for example, glycerol. Solutions of the prepolymer and the non-reactive PVA(s) in water or in aqueous salt solutions are preferred.

The aqueous salt solutions are advantageously solutions of physiologically tolerable salts, such as buffer salts customary in the field of contact lens care, for example phosphate salts, or isotonizing agents customary in the field of contact lens care, such as, especially, alkali halides, for example sodium chloride, or solutions of mixtures thereof. An example of an especially suitable salt solution is an artificial, preferably buffered, lacrimal fluid that in respect of pH value and osmolarity is adapted to natural lacrimal fluid, for example a sodium chloride solution that is unbuffered or that is preferably buffered, for example, by phosphate buffer, and that has an osmolarity that corresponds to the osmolarity of human lacrimal fluid.

The aqueous solution of the prepolymer and the further non-reactive PVA(s) defined hereinbefore is preferably a pure solution which means a solution which is free or essentially free from undesired constituents, for example, free from monomeric, oligomeric or polymeric starting compounds used for the preparation of the prepolymer, and/or free from secondary products formed during the preparation of the prepolymer. Especially preferred examples of such solutions are a solution of the prepolymer and the further non-reactive PVA(s) in pure water or in an artificial lacrimal fluid, as defined hereinbefore.

The aqueous solution of the PVA prepolymer may contain, in addition to one or more non-reactive PVAs and salts, further ingredients, for example a further solvent, an additional vinylic comonomer, a polyoxyethylene derivative, and/or a photoinitiator.

A further solvent of the aqueous PVA prepolymer solution may be, for example an alcohol, such as methanol, ethanol or n- or iso-propanol, or a carboxylic acid amide, such as N,N-dimethylformamide, or dimethyl sulfoxide. The aqueous solution preferably contains no further solvent.

The optional vinylic comonomer which, in accordance with the invention, may be used in addition in the crosslinking, may be hydrophilic or hydrophobic, or a mixture of a hydrophobic and a hydrophilic vinylic monomer. Suitable vinylic monomers include especially those customarily used in the manufacture of contact lenses. A hydrophilic vinylic monomer denotes a monomer that typically yields as homopolymer a polymer that is water-soluble or can absorb at least 10% by weight of water. Analogously, a hydrophobic vinylic monomer denotes a monomer that typically yields as homopolymer a polymer that is water-insoluble and can absorb less than 10% by weight of water.

Generally, approximately from 0.01 to 80 units of a typical vinylic comonomer react per unit of formula (1) or (3).

If a vinylic comonomer is used, the crosslinked polymers according to the invention preferably comprise approximately from 1 to 15%, especially preferably approximately from 3 to 8%, of units of formula (1) or (3), based on the number of hydroxy groups of the polyvinyl alcohol, which are reacted with approximately from 0.1 to 80 units of the vinylic monomer.

The proportion of the vinylic comonomers, if used, is preferably from 0.5 to 80 units per unit of formula (1), especially from 1 to 30 units per unit of formula (1), and especially preferably from 5 to 20 units per unit of formula (1).

It is also preferable to use a hydrophobic vinylic comonomer or a mixture of a hydrophobic vinylic comonomer with a hydrophilic vinylic comonomer, the mixture comprising at least 50% by weight of a hydrophobic vinylic comonomer. In that manner the mechanical properties of the polymer can be improved without the water content falling substantially. In principle, however, both conventional hydrophobic vinylic comonomers and conventional hydrophilic vinylic comonomers are suitable for the copolymerization with polyvinyl alcohol comprising groups of formula (1).

Suitable hydrophobic vinylic comonomers include, without the list being exhaustive, $C_1$-$C_{18}$alkyl acrylates and methacrylates, $C_3$-$C_{18}$alkyl acrylamides and methacrylamides, acrylonitrile, methacrylonitrile, vinyl-$C_1$-$C_{18}$alkanoates, $C_2$-$C_{18}$alkenes, $C_2$-$C_{18}$haloalkenes, styrene, $C_1$-$C_6$alkylstyrene, vinyl alkyl ethers, in which the alkyl moiety contains from 1 to 6 carbon atoms, $C_2$-$C_{10}$perfluoroalkyl acrylates and methacrylates or correspondingly partially fluorinated acrylates and methacrylates, $C_3$-$C_{12}$perfluoroalkyl-ethyl-thiocarbonylaminoethyl acrylates and methacrylates, acryloxy- and methacryloxy-alkylsiloxanes, N-vinylcarbazole, $C_1$-$C_{12}$alkyl esters of maleic acid, fumaric acid, itaconic acid, mesaconic acid and the like. $C_1$-$C_4$alkyl esters of vinylically unsaturated carboxylic acids having from 3 to 5 carbon atoms or vinyl esters of carboxylic acids having up to 5 carbon atoms, for example, are preferred.

Examples of suitable hydrophobic vinylic comonomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinylbutyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tris-trimethylsilyloxy-silyl-propyl methacrylate, 3-methacryloxypropylpentamethyldisiloxane and bis(methacryloxypropyl)-tetramethyldisiloxane.

Suitable hydrophilic vinylic comonomers include, without the list being exhaustive, hydroxy-substituted $C_1$-$C_6$-alkyl acrylates and methacrylates, acrylamide, methacrylamide, $C_1$-$C_4$-alkyl acrylamides and methacrylamides, ethoxylated acrylates and methacrylates, hydroxy-substituted $C_1$-$C_6$-alkyl acrylamides and methacrylamides, hydroxy-substituted $C_1$-$C_6$-alkyl vinyl ethers, sodium ethylenesulfonate, sodium styrenesulfonate, 2-acrylamido-2-methylpropanesulfonic acid, N-vinylpyrrole, N-vinylsuccinimide, N-vinylpyrrolidone, 2- or 4-vinylpyridine, acrylic acid, methacrylic acid, amino- (the term "amino" also including quaternary ammonium), mono-$C_1$-$C_6$-alkylamino- or di-$C_1$-$C_6$-alkylamino-$C_1$-$C_6$-alkyl acrylates and methacrylates, allylalcohol and the like. Hydroxy-substituted $C_2$-$C_4$alkyl(meth)acrylates, five- to seven-membered N-vinyl lactams, N,N-di-$C_1$-$C_4$alkyl (meth)acrylamides and vinylically unsaturated carboxylic acids having a total of from 3 to 5 carbon atoms, for example, are preferred.

Examples of suitable hydrophilic vinylic comonomers include hydroxyethyl methacrylate, hydroxyethyl acrylate, acrylamide, methacrylamide, dimethylacrylamide, allyl alcohol, vinylpyridine, vinylpyrrolidone, glycerol methacrylate, N-(1,1-dimethyl-3-oxobutyl)-acrylamide, and the like.

Preferred hydrophobic vinylic comonomers are methyl methacrylate and vinyl acetate. Preferred hydrophilic vinylic comonomers are 2-hydroxyethyl methacrylate, N-vinylpyrrolidone and acrylamide.

The aqueous solution of the PVA prepolymer preferably does not contain a comonomer.

A suitable polyoxyethylene derivative as ingredient of the aqueous PVA prepolymer solutions is, for example, a n-alkylphenyl polyoxyethylene ether, n-alkyl polyoxy-ethylene ether (e.g., TRITON®), polyglycol ether surfactant (TERGITOL®)), polyoxyethylenesorbitan (e.g., TWEEN®), polyoxyethylated glycol monoether (e.g., BRIJ®, polyoxylethylene 9 lauryl ether, polyoxylethylene 10 ether, polyoxylethylene 10 tridecyl ether), or a block copolymer of ethylene oxide and propylene oxide (e.g. poloxamers or poloxamines).

A class of preferred polyoxyethylene derivatives used in the present invention are polyethylene-polypropylene block copolymers, in particular poloxamers or poloxamines which are available, for example, under the tradename PLURONIC®, PLURONIC-R®, TETRONIC®, TETRONIC-R® or PLURADOT®.

Poloxamers are triblock copolymers with the structure PEO-PPO-PEO (where "PEO" is poly(ethylene oxide) and "PPO" is poly(propylene oxide). A considerable number of poloxamers is known, differing merely in the molecular weight and in the PEO/PPO ratio; Examples are poloxamer 101, 105, 108, 122, 123, 124, 181, 182, 183, 184, 185, 188, 212, 215, 217, 231, 234, 235, 237, 238, 282, 284, 288, 331, 333, 334, 335, 338, 401, 402, 403 and 407. The poloxamers may be used in the process of the invention irrespective of their PEO/PPO ratio; for example, poloxamer 101 having a PEO/PPO weight ratio of about 10/90 and poloxamer 108 having a PEO/PPO weight ratio of about 80/20 both have been found to be valuable as non-crosslinkable polymer in the aqueous solution according to step a).

The order of polyoxyethylene and polyoxypropylene blocks can be reversed creating block copolymers with the structure PPO-PEO-PPO, which are known as PLURONIC-R® polymers.

Poloxamines are polymers with the structure $(PEO\text{-}PPO)_2$—N—$(CH_2)_2$—N—$(PPO\text{-}PEO)_2$ that are available with different molecular weights and PEO/PPO ratios. Again, the order of polyoxyethylene and polyoxypropylene blocks can be reversed creating block copolymers with the structure $(PPO\text{-}PEO)_2$—N—$(CH_2)_2$—N—$(PEO\text{-}PPO)_2$, which are known as TETRONIC-R® polymers.

Polyoxypropylene-polyoxyethylene block copolymers can also be designed with hydrophilic blocks comprising a random mix of ethylene oxide and propylene oxide repeating units. To maintain the hydrophilic character of the block, ethylene oxide will predominate. Similarly, the hydrophobic block can be a mixture of ethylene oxide and propylene oxide repeating units. Such block copolymers are available under the tradename PLURADOT®.

The weight average molecular weight of the polyethylene/polypropylene block copolymers may vary within wide limits. An average molecular weight of, for example, from about 1000 to 20000, preferably from 1000 to 15000, more preferably from 1000 to 8000 and in particular from 1000 to 5000 has proven valuable for the use in the process of the invention.

A preferred group of polyoxyethylene derivatives according to the present invention are poloxamers of any PEO/PPO ratio and number average molecular weight. Particularly preferred poloxamers are those of a weight average molecular weight of from about 1000 to 8000 and especially from 1000 to 5000.

The polyoxyethylene derivative, if present, is added to the aqueous solution of the PVA prepolymer in an amount of, for example, up to 10% by weight, preferably up to 5% by weight, more preferably from 0.05 to 5% by weight, even more preferably from 0.1 to 4% by weight and in particular from 0.5 to 3% by weight, each based on the entire weight of the aqueous solution. One preferred embodiment of the invention concerns an aqueous solution of the PVA prepolymer comprising <1% by weight relative to the entire solution of the non-crosslinkable polymer. A further preferred embodiment of the invention concerns an aqueous solution of the PVA prepolymer comprising $\geqq$1% by weight, preferably from 1 to 5% by weight and in particular from 1 to 3% by weight each relative to the entire solution of the non-crosslinkable polymer.

In the case of photocrosslinking of the PVA prepolymer, it is appropriate to add a photoinitiator to the aqueous solution, which can initiate radical crosslinking. Examples thereof are familiar to the person skilled in the art and suitable photoinitiators that may be mentioned specifically are benzoin methyl ether, 1-hydroxycyclohexylphenyl ketone, or Darocure® or Irgacure® types, for example Darocure® 1173 or Irgacure® 2959. The amount of photoinitiator may be selected within wide limits, an amount of up to 0.05 g/g of prepolymer and especially of up to 0.003 g/g of prepolymer having proved beneficial.

The preparation of an aqueous solution comprising a water-soluble PVA prepolymer, the further non-reactive PVA(s) and other optional components, for example, as mentioned above can be carried out in a manner known per se. For example, the prepolymer is first of all synthesized in an aqueous solution or is isolated, for example, in pure form, which means free from undesired constituents, and is then dissolved in an aqueous medium. To this solution is then added the further non-reactive PVA or a mixture of two or more different non-reactive PVAs as well as optionally other ingredients as mentioned before, or an aqueous solution thereof; the further non-reactive PVAs and other ingredients or the solution thereof are likewise preferably in pure form, i.e. free from undesired constituents. The mixture is then stirred at room temperature until a clear homogeneous solution is obtained. If necessary the mixture may be heated, for example to about 50 to 80° C., in order to accelerate the formation of a homogeneous solution.

The viscosity of the PVA prepolymer solution is, within wide limits, not critical, but the solution should preferably be a flowable solution that can be deformed strain-free.

The aqueous solution of the PVA prepolymer is then introduced in a mold. Methods that are known per se, such as, especially, conventional metering in, for example by dropwise introduction, may be used to introduce the resulting solution into a mold. Suitable molds are generally customary contact lens molds as known in the state of the art. Thus, the contact lenses according to the invention can be manufactured, for example, in a manner known per se, for example in a conventional "spin-casting mold", as described, for example, in U.S. Pat. No. 3,408,429, or preferably in a static mold, for example as described, in U.S. Pat. No. 4,347,198 (so-called Full-Mold process). Appropriate molds are made, for example, from polypropylene. Glass, for example Quartz or sapphire glass, and metals are suitable materials for re-usable molds. Further examples of moldings according to the invention, besides contact lenses, are ophthalmic moldings of all kinds, for example intraocular lenses, artificial corneas or eye bandages; biomedical moldings, for example moldings that can be used in surgery, such as heart valves, artificial arteries or the like; and also films or membranes, for example membranes for diffusion control, photostructurizable films for information storage, or photoresist materials, for example membranes or moldings for etch resist or screen printing resist.

The crosslinking of the prepolymers in the mold according to step c) may be carried out, for example, by the action of heat or by irradiation, photocrosslinking using, for example, visible light, UV light or ionising radiation, such as gamma radiation or X-radiation, in particular using UV light, being preferred. The photocrosslinking, can be carried out according to the invention in a very short time, for example in less than five minutes, preferably in $\leqq$1 minute, especially in 1 to 60 seconds, especially preferably, in 2 to 30 seconds.

The photocrosslinking is carried out preferably directly from an aqueous solution of the prepolymers according to the invention, which can be obtained by the preferred purification step, ultrafiltration, after the addition of the non-crosslinkable further polymer and, where appropriate an additional vinylic comonomer. For example, an approximately 15 to 40% aqueous solution can be photocrosslinked.

The opening of the mold after the crosslinking such that the molding can be removed from the mold can be carried out in a manner known per se. Whereas in processes that have been proposed in the state of the art it is usually necessary at that point for purification steps to follow, for example extraction, and also steps for the hydration of the resulting moldings, especially contact lenses, such steps are not necessary in the process according to the invention.

Since the solution of the prepolymer preferably does not comprise any undesired low-molecular constituents, the crosslinked product, too, does not comprise any such constituents. Therefore subsequent extraction is not necessary. Since the crosslinking is carried out in a substantially aqueous solution, subsequent hydration is not necessary. Those two advantages mean, inter alia, that a complicated after-treatment of the resulting moldings, especially contact lenses, is dispensed with. The contact lenses obtainable in accordance with the process according to the invention are therefore, according to an advantageous embodiment, distinguished by the fact that they are suitable for their intended use without extraction. "Intended use" in this context means especially that the contact lenses can be used in the human eye. The contact lenses obtainable in accordance with the process according to the invention are, according to an advantageous embodiment, also distinguished by the fact that they are suitable for their intended use without hydration.

In case of contact lenses the moldings have to be autoclaved in a manner known per se after their removal from the molds. Contact lenses prepared from the preferred PVA materials comprising units of the above formula (1) or (3), are preferably further treated according to the autoclaving process as described in EP-A-0,900,394. The autoclaving process comprises, for example, the following steps:

i) transferring the hydrogel molding obtained according to step d) that contains hydrolytically removable side groups, in particular acetate groups, to a container,
ii) filling up the container containing the hydrogel molding with a basic buffer solution,
iii) closing the container, and
iv) autoclaving the container containing the hydrogel molding and the basic buffer solution at a temperature of at least 100° C., wherein, during the autoclaving, the hydrolytically removable side groups are essentially completely removed, the container contents are sterilized, and the basic buffer solution is converted into a physiologically acceptable aqueous solution that is substantially isotonic and pH-compatible with the lacrimal fluid of the human eye.

The details of the above autoclaving process are disclosed, for example, in EP-A-0,900,394, see, for example, working examples 1, 2 and 3 therein.

The process according to the invention is outstandingly well suited to the economical manufacture of a large number of moldings, such as contact lenses, in a short time. The contact lenses obtainable in accordance with the process according to the invention have inter alia the advantages over the contact lenses known from the state of the art that they can be used for their intended use without subsequent treatment steps, such as extraction or hydration.

The contact lenses according to the invention, especially those comprising a polymer based on a prepolymer comprising units of formula (1) or (3), can be produced in a very simple and efficient manner compared with the state of the art. This is as a result of several factors. First, the starting materials can be obtained or produced at a favorable cost. Secondly, there is the advantage that the prepolymers are stable, so that they can be subjected to a high degree of purification. It is therefore possible to use for the crosslinking a prepolymer that requires practically no subsequent purification, such as especially a complicated extraction of unpolymerized constituents. Also, the polymerization can be carried out in aqueous solution, so that a subsequent hydration step is not necessary. The photopolymerization occurs within a short period, so that the process for manufacturing the contact lenses according to the invention can be organized to be extremely economical from that point of view also.

All of the advantages mentioned above naturally apply not only to contact lenses but also to other moldings according to the invention. Taking into account all the various advantageous aspects in the manufacture of the moldings according to the invention it can be seen that the moldings according to the invention are especially suitable as mass-produced articles, such as, for example, contact lenses that are worn for a short time and then replaced by new lenses.

The contact lenses made according to the process of the invention have a wide range of unusual and extremely advantageous properties, which include, for example, their excellent compatibility with the human cornea, which is based on a balanced relationship of water content, oxygen permeability and mechanical properties. Moreover, the addition of the non-reactive PVA to the prepolymer solution in step a) surprisingly improves the quality, for example the wearing comfort, in particular the end-of-day comfort, of the contact lenses relative to contact lenses manufactured according to the same process without the addition of such a non-reactive PVA. In particular, contact lenses obtained according to the process of the invention with a concentration of $\geq 0.5\%$ by weight relative to the entire formulation of a non-reactive PVA in step a) are felt to be very comfortable by contact lens wearers especially during long wearing times.

The contact lenses according to the invention furthermore exhibit a high degree of dimensional stability. No changes in shape are detected even after autoclaving at, for example, about 120° C.

The previous disclosure will enable one having ordinary skill in the art to practice the invention. In order to better enable the reader to understand specific embodiments and the advantages thereof, reference to the following examples is suggested. In the Examples which follow, amounts are by weight, unless specified otherwise, and temperatures are given in degrees Celsius.

EXAMPLE 1

40 g (1.0 mol) of sodium hydroxide are dissolved in 100 g of water and 200 g of ice in a 1-liter reactor having a stirrer and a cooling system. The sodium hydroxide solution is cooled to 10° C., and 105.1 g (1.0 mol) of aminoacetaldehyde dimethylacetal and 10 mg of the inhibitor 4-hydroxy-2,2,6,6-tetramethylpiperidin-1-oxide are added. 99.5 g (1.1 mol) of acrylic acid chloride are slowly added to that solution at 10° C. over a period of 2 hours. The pH value drops slowly and ultimately is adjusted to 7. According to GC, amine is no longer present. The reaction mixture is saturated with sodium chloride and extracted three times with 200 ml of tert-butyl methyl ether. The organic phase is dried, filtered and concentrated using a rotary evaporator. The resulting oil is extracted three times with petroleum ether and then dried again using a rotary evaporator. 130 g of acrylamidoacetaldehyde dimethylacetal (81% of theory) are obtained in the form of an oil; the product is 99% according to GC.

EXAMPLE 2

This Example illustrates a general method for the preparation of a PVA prepolymer having a low acetate content.

300 g of PVA (for example Moviol Hoechst 4-88) are placed in a 2-liter double-jacket reactor having a stirrer and thermometer, 800 g of deionised water are added and the mixture is heated to 95° C. with stirring. After one hour, everything has dissolved to produce a clear solution which is cooled to 20° C. 27 g (0.155 mol) of methacrylamidoacetaldehyde dimethyl acetal (synthesis see EP-A-0,641,806, Example 11), 200 g of concentrated hydrochloric acid (37%) and sufficient deionised water (in this specific case: 673 g) are added to produce a total of 2000 g of reaction solution. The mixture is stirred at 20° C. After 20 hours, a sample of the reaction solution is titrated with sodium hydroxide and the degree of hydrolysis of the PVA is ascertained: HCl=1.034 meq/g, acetic acid=0.265 meq/g corresponding to 3.5 mol % residual acetate. The reaction mixture is stirred for a further 2 hours at 25° C. and titrated again. HCl=1.034 meq/g, acetic acid=0.277 meq/g, corresponding to 2.93 mol % residual acetate.

The isolation can be carried out by means of ultrafiltration: the reaction mixture is cooled to 15° C. and adjusted to pH 7 with aqueous NaOH (5%). The polymer solution is filtered by way of a 0.45 μm filter and purified by means of ultrafiltration. The ultrafiltration is carried out using a 1-KD-Omega membrane produced by Filtron. Ultrafiltration is carried out to a residual sodium chloride content of 0.002%. 1800 g of a 14.02% polymer solution (86% of theory) are obtained; N-content (Kjeldahl determination)=0.741%, acetate content (after titration)=0.605 meq/g corresponding to 2.91 mol %, inherent viscosity: 0.327, double bonds: 0.61 meq/g (ascertained by microhydrogenation), free hydroxy groups (ascertained by reacetylation): 18.13 meq/g, GPC analysis (in water): Mw=22 007, Mn=9 743, Mw/Mn=2.26.

The isolation can also be carried out by means of precipitation: the reaction mixture is adjusted to pH 3.6 with triethylamine and precipitated in acetone in a ratio of 1:10. The precipitate is separated off, dispersed twice with ethanol and once with acetone, and dried. The product so obtained is comparable with that obtained by ultrafiltration.

EXAMPLE 3

Preparation of a PVA Prepolymer Solution 31 g of the acetal of Example 1 are reacted according to the preparative method according to Example 2. To the prepolymer solution obtained are added with stirring 0.3% by weight, based on the entire solution, of poloxamer 108 (Pluronics® F38).

prepolymer data (sol): N content: 1.41%, acetal content: 1.00 meq/g, acetate content: 6.2 mol %, solids content: 30% in the sol state

EXAMPLE 4a-4e

Preparation of a PVA Prepolymer Solution Comprising One or More Non-Reactive PVA To the prepolymer solution obtained according to Example 3 is added with stirring an amount of non-reactive PVA as indicated in the Table 1 below. Stirring is continued until a clear homogeneous solution is obtained in each case (about 20-90 minutes). If necessary the mixture may be heated, for example to about 50 to 80° C., in order to accelerate the formation of a homogeneous solution

TABLE 1

| Example | Non-reactive PVA | Ratio of PVAs | Total concentration of PVAs [% by weight based on the entire solution] |
|---|---|---|---|
| 4a | MOWIOL ® 6-98[1]) and MOWIOL ® 10-98[2]) | 2:1 | 0.6 |
| 4b | MOWIOL ® 6-98[1]) and MOWIOL ® 10-98[2]) | 1:1 | 0.6 |
| 4c | MOWIOL ® 6-98[1]) and MOWIOL ® 10-98[2]) | 3:1 | 0.6 |
| 4d | MOWIOL ® 6-98[1]) and MOWIOL ® 10-98[2]) | 1:3 | 0.6 |
| 4e | MOWIOL ® 6-98[1]) and MOWIOL ® 10-98[2]) | 1:2 | 0.6 |

[1])PVA having Mw ~47000 (from KSE)
[2])PVA having Mw ~61000 (from KSE)

EXAMPLE 5

Preparation of a Contact Lens 0.05 to 0.3% (based on polymer content) of the photoinitiator Irgacure 2959 is added to each of the prepolymer solution obtained according to Examples 3 and 4a to 4e. The solution is transferred to transparent contact lens molds of polypropylene and irradiated therein for 4-6 seconds using a 200 W Oriel UV lamp (150 mW/cm$^2$). The molds are then opened and the lenses are removed. The lenses are in each case transparent.

EXAMPLE 6

Autoclaving a Contact Lens

The contact lenses obtained according to Example 5 are each autoclaved in 0.5 ml of Na$_2$HPO$_4$ solution (135 mmol/l Na$_2$HPO$_4$) for 45 min. at 122° C. in a conventional PP packaging having an aluminium sealing foil.

After autoclaving, the diameter and the E-modulus of the contact lenses are determined. No significant differences in lens diameter and E-modulus can be identified between lenses made from a solution of Example 3 and from a solution of either of Examples 4a-4e.

In addition, the wearing comfort of the contact lenses is assessed in a clinical study. The test persons rate the contact lenses obtained according to Examples 4 and especially those of Examples 4d-4e as very comfortable and point out the excellent end-of-day comfort.

The following table lists clinical trials carried out comparing contact lenses made from the formulation of Example 4a to lenses made from the formulation of Example 3.

| Trial No. | No. of subjects | Preferred comfort of product from Ex. 4a | Preferred comfort of product from Ex. 3 |
|---|---|---|---|
| 1 | 9 | 56% | 22% |
| 2 | 8 | 62% | 25% |
| 3 | 12 | 83% | 0% |
| 4 | 5 | 80% | 20% |
| 5 | 5 | 100% | 0% |
| 6 | 25 | 52% | 28% |
| 7 | 133 | 55% | 45% |
| Total | 196 | 60% | 36% |

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Furthermore, titles, headings, or the like are provided to enhance the reader's comprehension of this document, and should not be read as limiting the scope of the present invention. Accordingly, the spirit and scope of the appended claims should not be limited to the description of the preferred versions contained therein.

The invention claimed is:

1. A contact lens which is obtained by crosslinking in a mold an aqueous formulation comprising a crosslinkable polyvinyl alcohol prepolymer, a first non-reactive polyvinyl alcohol having a lower molecular weight $M_n$ of from 25000 to 50000, and a second non-reactive polyvinyl alcohol having a higher molecular weight $M_n$ of from above 50000 to 100000, wherein the crosslinkable polyvinyl alcohol prepolymer comprises a polyvinylacetate backbone and photocrosslinkable or thermally crosslinkable groups, wherein the first and second non-reactive polyvinyl alcohols are devoid of polymerizable groups, wherein the difference in number-average molecular weight between the first and second non-reactive polyvinyl alcohols is at least 10000, wherein the first and second non-reactive polyvinyl alcohols are present in the aqueous formulation in an amount of from 0.25 to 3% by weight, based on the entire weight of the aqueous formulation, wherein the weight proportion of the lower molecular weight $M_n$ non-reactive polyvinyl alcohol and higher molecular weight $M_n$ non-reactive polyvinyl alcohol in the aqueous formulation is from 1:1 to 5:1, wherein the contact lens is characterized by having an improved end-of-day wearing comfort relative to contact lenses manufactured according to an identical process without the addition of the amount of the first and second non-reactive polyvinyl alcohols in the aqueous formulation for making the contact lenses.

2. The contact lens according to claim 1, wherein the crosslinkable polyvinyl alcohol prepolymer is a derivative of a polyvinyl alcohol having an average molecular weight $M_n$ of at least 10000, wherein, based on the number of hydroxy groups of the polyvinyl alcohol, from approximately 0.5 to approximately 80% of units of the crosslinkable polyvinyl alcohol prepolymer is represented by formula (1)

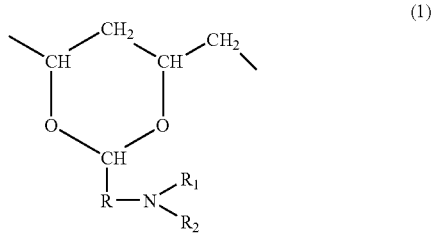

(1)

wherein R is $C_1$-$C_8$-alkylene, $R_1$ is hydrogen or $C_1$-$C_7$-alkyl and $R_2$ is an ethylenically unsaturated, electron-attracting, copolymerizable radical having up to 25 carbon atoms.

3. The contact lens of claim 2, which is a hydrogel contact lens.

4. The contact lens of claim 3, wherein $R_2$ is a radical of formula (2)

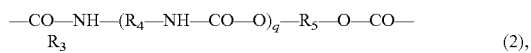

(2), wherein q is zero or one and $R_4$ and $R_5$ are each independently $C_2$-$C_8$-alkylene, $C_8$-$C_{12}$-arylene, a saturated divalent $C_6$-$C_{10}$-cycloaliphatic group, $C_7$-$C_{14}$-arylenealkylene or $C_7$-$C_{14}$-alkylenearylene or $C_{13}$-$C_{16}$-arylenealkylenearylene, and $R_3$ is $C_2$-$C_8$-alkenyl.

5. The contact lens of claim 4, wherein the weight proportion of the lower molecular weight $M_n$ non-reactive polyvinyl alcohol and the higher molecular weight $M_n$ non-reactive polyvinyl alcohol in the aqueous formulation is from 1:1 to 4:1.

6. The contact lens of claim 5, wherein the crosslinkable polyvinyl alcohol prepolymer has a number average molecular weight $M_n$ of from 12000 to 25000.

7. The contact lens of claim 6, wherein the aqueous formulation comprises in addition a polyethylene-polypropylene block copolymer.

8. The contact lens of claim 4, wherein the crosslinkable polyvinyl alcohol prepolymer has a number average molecular weight $M_n$ of from 12000 to 25000, wherein the first non-reactive polyvinyl alcohol has a lower average molecular weight $M_n$ of from 30000 to 50000, wherein the second non-reactive polyvinyl alcohol has a higher average molecular weight $M_n$ of from above 50000 to 100000.

9. The contact lens of claim 3, wherein R is $C_1$-$C_4$-alkylene, $R_1$ is hydrogen or $C_1$-$C_4$-alkyl, and $R_2$ is a radical $R_3$-CO—, in which $R_3$ is $C_2$-$C_4$-alkenyl.

10. The contact lens of claim 9, wherein the weight proportion of the lower molecular weight $M_n$ non-reactive polyvinyl alcohol and the higher molecular weight $M_n$ non-reactive polyvinyl alcohol in the aqueous formulation is from 1:1 to 4:1.

11. The contact lens of claim 9, wherein the crosslinkable polyvinyl alcohol prepolymer has a number average molecular weight $M_n$ of from 12000 to 25000, wherein the first non-reactive polyvinyl alcohol has a lower average molecular weight $M_n$ of from 30000 to 50000, wherein the second non-reactive polyvinyl alcohol has a higher average molecular weight $M_n$ of from above 50000 to 100000.

12. The contact lens of claim 3, wherein the weight proportion of the lower molecular weight $M_n$ non-reactive polyvinyl alcohol and the higher molecular weight $M_n$ non-reactive polyvinyl alcohol in the aqueous formulation is from 1:1 to 4:1.

13. The contact lens of claim 12, wherein the crosslinkable polyvinyl alcohol prepolymer has a number average molecular weight $M_n$ of from 12000 to 25000.

14. The contact lens of claim 3, wherein the aqueous formulation comprises in addition a polyethylene-polypropylene block copolymer.

15. The contact lens of claim 3, wherein the crosslinkable polyvinyl alcohol prepolymer has a number average molecular weight $M_n$ of from 12000 to 25000, wherein the first non-reactive polyvinyl alcohol has a lower average molecular weight $M_n$ of from 30000 to 50000 and wherein the second non-reactive polyvinyl alcohol has a higher average molecular weight $M_n$ of from above 50000 to 100000.

16. The contact lens of claim 15, wherein the weight proportion of the lower molecular weight $M_n$ non-reactive polyvinyl alcohol and the higher molecular weight $M_n$ non-reactive polyvinyl alcohol in the aqueous formulation is from 1:1 to 4:1.

17. The contact lens of claim 16, wherein the aqueous formulation of the crosslinkable polyvinyl alcohol prepolymer comprises in addition a polyethylene-polypropylene block copolymer.

* * * * *